United States Patent Office 3,119,802
Patented Jan. 28, 1964

3,119,802
POLYMERIZATION OF ETHYLENICALLY UNSATURATED COMPOUNDS WITH UNSATURATED, ALPHA-SUBSTITUTED DIACYL PEROXIDE CATALYSTS
James E. Guillet, James P. Hawk, and Edmund B. Towne, all of Kingsport, Tenn., assignors to Eastman Kodak Company, Rochester, N.Y., a corporation of New Jersey
No Drawing. Filed June 6, 1960, Ser. No. 33,877
18 Claims. (Cl. 260—94.9)

This invention relates to processes for the polymerization of ethylenically unsaturated polymerizable compounds and particularly to new catalysts for these polymerization processes. In a specific aspect, this invention relates to novel unsaturated, α-substituted diacyl peroxides and their use as catalysts in the polymerization of ethylenically unsaturated polymerizable compounds. In another aspect, this invention concerns the preparation of intermediate-density polyethylene, i.e., polyethylene having a density in the range of about 0.935 to about 0.945, in the presence of a novel unsaturated, α-substituted diacyl peroxide.

It is known that ethylenically unsaturated compounds, and particularly ethylene, can be polymerized at temperatures in the range of about 50 to about 400° C. at high pressures, for example, 5,000 p.s.i. or higher. Catalysts which have been suggested for use in these high pressure processes include, for example, oxygen, per-salts, acyl peroxides, metal alkyls and azo compounds. However, acyl peroxides which are employed as catalysts in the many varied polymerization reactions exhibit certain deficiencies as wholly desirable polymerization catalysts. A significant limitation upon the use of prior art acyl peroxides as catalysts in the polymerization of vinyl monomers has been the lack of effectiveness of any one, or a combination of these peroxides, over a broad range of temperatures. Hence, α-substituted saturated peroxides cannot be used effectively above about 100° C. because they decompose too rapidly. Alternatively, the aliphatic diacyl peroxides such as lauroyl peroxide, acetyl peroxide and the like decompose too slowly at temperatures below about 190° C. to give high efficiency in a continuous process. This limitation on prior art acyl peroxide catalysts is particularly significant in the polymerization of ethylene to form polymers of intermediate density, i.e., polyethylene having a density in the range of about 0.935 to about 0.945, since these polymers are usually made at temperatures between about 120 and 190° C. Intermediate-density polyethylene is, of course, a very valuable product for specific applications since it combines many of the desirable properties of both low and high-density polyethylene.

The reason why intermediate-density polyethylene cannot be prepared using the conventional prior art aliphatic acyl peroxide catalysts in the high pressure processes is because the properties of this polymer, as prepared by these high pressure processes, are particularly dependent upon the temperature of polymerization. At low temperatures, high-density polyethylene, i.e., polyethylene having a density above about 0.945 results while at high temperatures low-density polyethylene, i.e., polyethylene having a density less than 0.935 is obtained. For example, as shown in U.S. Patent 2,865,904 which issued December 23, 1958, aliphatic α-substituted peroxides are used in the preparation of high-density polyethylene by the high pressure process. This patent also discloses that aliphatic diacyl peroxides are used at high temperatures for the preparation of low-density polyethylene. In order to prepare intermediate-density polyethylene, however, the monomer must be polymerized at intermediate temperatures, using a catalyst which decomposes at the desired temperature of polymerization to give radicals of sufficient activity to catalyze the polymerization of the ethylene. In order to obtain maximum catalyst efficiency it is necessary to use a catalyst which decomposes completely during the time of the reaction but not so rapidly so as to decompose completely in the first few seconds. Since, as indicated above, intermediate-density polyethylene is usually made at temperatures in the range of about 120 to about 190° C., it is extremely desirable to have a catalyst which reaches its maximum efficiency within this range. It is evident, therefore, that the state of the art will be greatly enhanced by providing a class of acyl peroxide catalysts which reach their maximum efficiency at temperatures within the aforementioned range. Likewise, a noteworthy contribution to the art will be a method for the polymerization of ethylenically unsaturated compounds employing such catalysts.

A further limitation upon the use of organic peroxides in general, and particularly on their use as polymerization catalysts, is their high sensitivity of heat which makes them potentially hazardous chemicals. When proper temperature controls are used many of these organic peroxides can be handled in industry without serious danger. However, certain types of peroxides are also sensitive to shock and this may cause them to detonate in pumps or other equipment even when their temperature is maintained at a low level. Compounds of this type cause special hazards which make them undesirable for many commercial uses. It is obvious, therefore, that an organic peroxide catalyst having a high efficiency in catalyzing the polymerization of ethylenically unsaturated compounds, which catalyst is insensitive to shock, would also be a substantial contribution to the art.

Accordingly, it is an object of this invention to provide novel acyl peroxide catalysts which are effective to polymerize unsaturated polymerizable compounds.

Another object of this invention is to provide catalysts which are effective to polymerize ethylenically unsaturated compounds over a range of temperatures between those of the aliphatic α-substituted peroxides and the aliphatic straight chain diacyl peroxides now available in the prior art.

A further object of this invention is to provide a catalyst which is particularly effective in the preparation of intermediate-density polyethylene, i.e., polyethylene having a density in the range of about 0.935 to about 0.945.

Still another object of this invention is to provide acyl peroxide catalyst which are insensitive to shock so that they can be handled without special precautions in commercial equipment.

Other objects will become apparent upon an examination and consideration of the specification and claims which follow.

In accordance with this invention it has been found that ethylenically unsaturated polymerizable compounds, and particularly ethylene, can be polymerized over a broad temperature range, i.e., 50 to 225° C., at pressures of at least 5,000 p.s.i., in the presence of unsaturated, α-substituted diacyl peroxide catalysts as hereinafter defined.

The novel unsaturated, α-substituted diacyl peroxides used in the process of our invention possess the general formula:

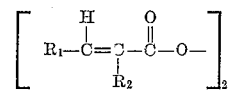

wherein $R_1$ can be any aliphatic, alkaryl or cycloaliphatic group, desirably containing from 1 to 14 carbon atoms, and $R_2$ can be any alkyl, cycloalkyl or alkoxy group, desirably containing 1 to 6 carbon atoms.

The novel unsaturated, α-substituted diacyl peroxides which are employed in the practice of our invention are characterized by a double bond in the 2-position from the carbonyl group. An unexpected feature of the invention is that if the double bond is in any other position, the compounds are no longer effective catalysts in the polymerization of ethylenically unsaturated compounds. For example, in those compounds where the double bond is in the 3-position the catalyst will decompose at even lower temperatures than the α-substituted acyl peroxides of the prior art as shown, for example, in U.S. Patent 2,865,904, referred to hereinabove. Furthermore, the allyl-type radical formed in the decomposition has a low efficiency for initiation of polymerization of monomers such as ethylene. When the double bond is further removed from the carbonyl group, such as in the 4 or 5-position, the peroxide decomposes in the same temperature range as a straight chain saturated diacyl peroxide. In contrast, our compounds are extremely effective catalysts for the polymerization of ethylenically unsaturated compounds and particularly ethylene.

Another surprising feature of this invention is that closely analogous compounds, for example, those in which $R_2$ in the above formula is hydrogen, are unsuited for the purposes of the present invention since they decompose at higher temperatures than the straight chain saturated diacyl peroxides of the prior art. Furthermore, compounds in which $R_1$ is hydrogen, such as methacryloyl peroxide, are very sensitive to shock, possibly because they tend to polymerize by addition at the vinyl double bond to give a polymeric peroxide. In contrast, however, our new compounds, in which neither $R_1$ nor $R_2$ are hydrogen, stable compounds are obtained which have the properties desired for a vinyl polymerization catalyst.

The $R_1$ radicals, as indicated above, can be any aliphatic, alkaryl or cycloaliphatic group, desirably containing from 1 to 14 carbon atoms. Suitable radicals therefore include, for example, methyl, ethyl, propyl, isopropyl, butyl, decyl, dodecyl, tetradecyl, toluyl, methyl, propyl and dibutyl substituted phenyl, cyclopentyl, cyclohexyl, cycloheptyl and the like. Suitable $R_2$ radicals included within the scope of our invention are any of the alkyl, cycloalkyl or alkoxy radicals, desirably containing from 1 to 6 carbon atoms. Included within this class of radicals are, for example, methyl, ethyl, propyl, hexyl, cyclobutyl, cyclohexyl, cyclopentyl, methoxy, ethoxy, butoxy and the like. Hence, examples of our novel unsaturated, α-substituted diacyl peroxides include bis(2-ethyl-2-hexenoyl)peroxide, bis(2-methyl-2-pentenoyl)peroxide, bis(2-methyl-3-cyclohexyl-2-propenoyl)peroxide, bis(2-methoxy-2-pentenoyl)peroxide and the like.

A convenient method for preparing the new peroxides of this invention comprises reacting an unsaturated, α-substituted acyl halide of the formula:

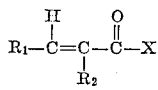

wherein $R_1$ and $R_2$ are as defined above and X is a halide, for example, chlorine or bromine, with an inorganic peroxide such as an alkali or alkaline earth metal peroxide, e.g., sodium, calcium or barium peroxide, at a relatively low temperature such as −40° C. to +15° C. and preferably between about −5° C. to +5° C. While the reaction mixture may be allowed to rise to higher temperatures up to about 25° C., for example, as a precautionary measure, temperatures in excess of 25° C. are inadvisable. In a preferred mode of preparing these peroxides a toluene solution of the halide is added gradually, as, for example, dropwise, at a temperature within the range hereinbefore disclosed, to an aqueous solution or slurry of the alkali or alkaline earth metal peroxides. The reaction is continued to completion which is usually a period of not more than 6 hours after mixing the reactants. The resulting peroxide can then be isolated by the conventional concentration procedures. Although not essential, it is usually desirable to use a slight excess of the inorganic peroxide.

Other reaction media besides water, for example, water-soluble alcohols such as ethanol, methanol and mixtures of water with these alcohols can be employed to dissolve the inorganic peroxide. Best results are, in general obtained with water alone. The amount of water employed is subject to wide variation. Twenty to one hundred parts of water per part of sodium peroxide, for example, usually gives satisfactory results. Furthermore, any of the conventional aliphatic, cyclo-aliphatic or aromatic solvents can be used as the solvent for the halide reactant. Suitable solvents for this purpose include, for example, benzene, toluene, heptane and the like.

The temperatures employed in the polymerization reaction are subject to wide variation and depend upon such variable factors as the monomer employed, the duration of heating, the pressure employed, and the type of process, for example, continuous or batch. However, in general the catalyst of our invention may be used over a broad temperature range of about 50 to about 225° C. In a batch process, temperatures within the range of about 50 to about 130° C. will give satisfactory results while temperatures within the range of about 140 to about 225° C. are generally preferred in a continuous process. The pressure to be employed is also subject to wide variation and may be any of the conventional pressures employed in high pressure processes although pressures in excess of about 5,000 p.s.i. are desirable, with pressures within the range of about 10,000 to about 50,000 p.s.i. being preferred. The polymerization is carried out in the presence of from 5 parts per million to 5% by weight, based on the monomer to be polymerized with catalyst concentrations of 10 to 10,000 parts per million being preferred in the case of ethylene. In addition, it is also possible to employ chain transfer agents, e.g., hydrogen, simple aliphatic hydrocarbons and the like, or catalyst activators, e.g., sulfites, aromatic amines, sulfur dioxide, dimethyl aniline and the like, in the process of our invention.

The novel catalysts of this invention are extremely versatile and can be employed in the polymerization of any one or mixtures of ethylenically unsaturated polymerizable compounds containing at least one $CH_2=C<$ group and particularly those containing a $CH_2=CH-$ group. These catalysts are particularly suited for the polymerization of monoolefinically unsaturated olefins containing 2 to 10 carbon atoms or mixtures thereof. Suitable polymerizable compounds included within the scope of this invention, therefore, are compounds such as ethylene, propylene, butene, decene, styrene, acrylic acid, methyl methacrylate, vinyl chloride, vinylidene chloride and the like.

As indicated above, in order to obtain maximum catalyst efficiency, the catalyst must decompose completely during the reaction, but not so rapidly as to decompose in the first few seconds. In discussing the rate of decomposition of peroxides, it is convenient to use a measurement of the "half-life" $\tau$. This is defined as the time required at any given temperature for one half of the peroxide to decompose. In dilute solution in an inert solvent, most peroxides show a unimolecular decomposition in which the half life is a constant, independent of the initial concentration and of the solvent, and dependent only on temperature. The half life of the peroxide may be determined in a number of ways. A convenient method is to heat a dilute solution of the catalyst in a solvent such as heptane or toluene for a given length of time at a constant temperature. If the initial concentration of the peroxide is a g./l. and after heating for $t$ seconds the concentration is $x$ g./l., the rate constant $k$ for the decomposition is given by the equation:

$$k = \frac{2.303}{t} \log_{10} \frac{(a)}{a-x}$$

and the half life $$\tau = \frac{0.693}{k}$$

In general, for maximum efficiency, the half life of a catalyst at the polymerization temperature should be of the order of $\frac{1}{10}$ to $\frac{1}{4}$ of the total time, although in some special cases half-lives of $\frac{1}{100}$ of the reaction time can be tolerated if the radicals are highly efficient and it is desired to have no traces of undecomposed catalyst carry through the reaction. Shorter half-lives than this mean that the peroxide will be completely decomposed with the first few seconds, leaving no catalyst for the remainder of the reaction time. This is highly inefficient. Longer half lives than the above limits result in an appreciable carry-over of undecomposed catalyst in the product and an inefficient usage of the catalyst.

The catalyst half life requirements of batch and continuous processes are similar except insofar as the continuous polymerization processes normally use shorter reaction times than do most batch processes. For example, the small-scale batch polymerization of ethylene is conveniently carried out for periods of 1 to 4 hours. Because of heat transfer problems, faster rates than this are not practical in batch equipment. Continuous polymerizations, however, are frequently carried out at contact times of from 1 to 10 minutes. If the two types of polymerization are carried out at the same time temperature, different catalysts are required because of the half-life requirements elucidated above. The catalyst used for the batch process must have a half-life of the order of 100 times that of the continuous process. Alternatively, if the same catalyst is used in both reactors, it will be necessary to run the batch reaction at a temperature of 40 to 60° C. below that of the continuous process in order to obtain the desired increase in catalyst half-life. In general, the catalysts of our invention exhibit a half-life $\tau$ within the range of about $2 \times 10^3$ seconds to about $8.0 \times 10^4$ seconds in a 1% toluene solution at 60° C.

This invention can be further illustrated by the following examples of preferred embodiments thereof although it will be understood that these examples are included merely for purposes of illustration and are not intended to limit the scope of the invention unless otherwise specifically indicated:

EXAMPLE 1

A solution containing 32.0 parts of 2-ethyl-2-hexenoyl chloride in toluene was slowly added dropwise to an aqueous solution containing 7.8 parts of sodium peroxide at 0° C. The temperature rose to 5.0° C. and then slowly dropped to 0° C. at which point it was maintained until the reaction was complete. The resulting solution of bis(2-ethyl-2-hexenoyl) peroxide which resulted was washed with ice water until neutral, and concentrated by removal of the toluene under vacuum.

The rate of decomposition of the bis(2-ethyl-2-hexenoyl)peroxide was determined in toluene solution at a concentration of 1 g. per 100 cc. by heating samples in a constant temperature bath and titrating the residual peroxide with potassium iodide. The half-life $\tau$, at various temperatures, is set forth in Table 1 below. The half life of this product is contrasted with that of lauroyl peroxide and isobutyryl peroxide at these same temperatures.

Table 1

| Temperature, °C. | 2-Ethyl-hexenoyl Peroxide, sec. | Lauroyl Peroxide, sec. | Isobutyryl Peroxide, sec. |
| --- | --- | --- | --- |
| 0 | $2.0 \times 10^7$ | $10^9$ | $1.5 \times 10^7$ |
| 24 | $8.2 \times 10^5$ | $1.6 \times 10^7$ | $2.2 \times 10^5$ |
| 61 | $5.4 \times 10^3$ | $8.5 \times 10^4$ | $1.5 \times 10^3$ |
| 140 | 7.0 | 10 | 0.6 |
| 180 | 0.8 | 0.5 | 0.05 |

To illustrate the non-sensitivity of bis(2-ethyl-2-hexenoyl)peroxide to shock, small samples of the pure compound were subjected to impact by a dropping weight. In this test the amount of gas given off by the sample is determined and used as a measure of the amount of decomposition. The sensitivity of the compound is determined either by the height required to cause the compound to decompose or by the dilution required to make it insensitive to the impact of a weight dropped from the maximum height available with the instrument. When subjected to this test, the pure bis(2-ethyl-2-hexenoyl) peroxide was insensitive to shock at the maximum height which was available with the instrument. The energy involved was 400-inch pounds, transmitted across an area of 0.075 sq. in.

EXAMPLE 2

As indicated above, the unsaturated, α-substituted diacyl peroxides of our invention are extremely effective catalysts in the polymerization of ethylenically unsaturated compounds at temperatures where the prior art acyl peroxide catalysts such as lauroyl peroxide and isobutyryl peroxide are extremely ineffective. To illustrate the superiority of our catalysts in this respect several runs were carried out as follows:

A 100 cc. stainless steel autoclave, equipped with a magnetic agitator, was charged with bis(2-ethyl-2-hexenoyl) peroxide in benzene solution. The autoclave was flushed with ethylene, then pressured with ethylene to the desired level and the temperature raised to reaction temperature. The reaction pressure was maintained by addition of compressed gas for a period of 2 hours, after which the reactor was cooled down and the unreacted ethylene vented. The polymer was recovered from the autoclave in the form of a dry spongy mass.

The results of these runs using the above procedure with bis(2-ethyl-2-hexenoyl)peroxide, bis(isobutyryl)peroxide and lauroyl peroxide are set forth in Table 2 which follows:

Table 2

| Catalyst | Weight Catalyst, mg. | Reaction Temperature, °C. | Reaction Pressure, p.s.i. | Yield, g. |
| --- | --- | --- | --- | --- |
| Bis(2-ethyl-2-hexenoyl)peroxide | 5 | 50 | 20,000 | 1.15 |
| Do | 5 | 75 | 20,000 | 1.40 |
| Do | 5 | 95 | 20,000 | 6.0 |
| Do | 5 | 115 | 20,000 | 5.4 |
| Do | 5 | 130 | 20,000 | <0.5 |
| Bis(isobutyryl)peroxide | 10 | 70 | 20,000 | 0.35 |
| Do | 5 | 50 | 20,000 | 9.35 |
| Do | 25 | 30 | 20,000 | 8.50 |
| Lauroyl peroxide | 5 | 70 | 20,000 | 0 |
| Do | 5 | 90 | 20,000 | 2.15 |
| Do | 10 | 130 | 20,000 | 6.65 |
| Do | 1 | 140 | 20,000 | 1.30 |

Upon examination of the above table it is readily apparent that bis(2-ethyl-2-hexenoyl)peroxide will operate as an effective catalyst at temperatures which are below those at which lauroyl peroxide is effective. Thus, polymer was obtained at temperatures as low as 50° C. with the catalyst of our invention while no polymer was obtained with lauroyl peroxide even at 70° C. Furthermore, it is readily seen that bis(2-ethyl-2-hexenoyl)peroxide is extremely effective at 95° C. while bis(isobutyryl)peroxide is substantially ineffective as a catalyst even at 70° C. This effect is even more pronounced in a continuous polymerization system. Hence, in a continuous stirred reactor, operating at a pressure of 20,000 p.s.i. and a contact time of approximately 2.5 minutes, the minimum operating temperature of lauroyl peroxide is 170° C. while bis(isobutyryl)peroxide becomes ineffective above 135° C. In contrast, bis(2-ethyl-2-hexenoyl)peroxide operates at temperatures down to 140° C. Thus, in a continuous reactor bis(2-ethyl-2-hexenoyl)peroxide operates with optimum efficiency in the temperature range of about 140 to about 225° C. while lauroyl peroxide is most efficient at about 170 to about 230° C. and bis(isobutyryl)peroxide below about 140° C.

EXAMPLE 3

Bis(2-ethyl-4-methyl-2-pentenoyl)peroxide, bis(2,4-dimethyl-2-pentenoyl)peroxide, bis(2-methyl-2-pentenoyl) peroxide, bis(2-methyl-3-cyclohexyl-2-propenoyl)peroxide and bis(2-methoxy-2-pentenoyl)peroxide were prepared by reacting the corresponding unsaturated, substituted acyl chloride with sodium peroxide according to the procedure set forth in Example 1. These compounds were then employed as catalysts in the polymerization of ethylene according to the procedure set forth in Example 2. The results of these polymerization runs are set forth in Table 3 which follows:

Table 3

| Run | Catalyst | Weight Catalyst, mg. | Reaction Temperature, °C. | Reaction Pressure, p.s.i. | Reaction Time, hrs. | Yield of Polyethylene, g. | Half Life of Catalyst,[1] seconds |
|---|---|---|---|---|---|---|---|
| 1 | Bis(2-ethyl-4-methyl-2-pentenoyl)peroxide | 50 | 70 | 20,000 | 2 | 8.3 | $7.0 \times 10^3$ |
| 2 | do | 5 | 80 | 20,000 | 2 | 5.5 | $7.0 \times 10^3$ |
| 3 | do | 5 | 90 | 20,000 | 2 | 5.85 | $7.0 \times 10^3$ |
| 4 | do | 5 | 110 | 20,000 | 2 | 4.8 | $7.0 \times 10^3$ |
| 5 | Bis(2,4-dimethyl-2-pentenoyl)peroxide | 5 | 110 | 20,000 | 2 | 4.10 | $6.0 \times 10^4$ |
| 6 | do | 5 | 130 | 20,000 | 2 | 8.50 | $6.0 \times 10^4$ |
| 7 | Bis(2-methyl-2-pentenoyl)peroxide | 5 | 110 | 20,000 | 2 | 3.95 | $5.3 \times 10^4$ |
| 8 | do | 5 | 130 | 20,000 | 2 | 3.45 | $5.3 \times 10^4$ |
| 9 | Bis(2-methyl-3-cyclohexyl-2-propenoyl)peroxide | 5 | 80 | 20,000 | 2 | 5.7 | $6.7 \times 10^3$ |
| 10 | Bis(2-methoxy-2-pentenoyl)peroxide | 5 | 80 | 20,000 | 2 | 7.3 | $3.2 \times 10^3$ |

[1] 1% solution in toluene at 60° C.

Each of the catalysts employed in the above runs, when subjected to the shock sensitivity test described in Example 1, are found to be insensitive to shock.

EXAMPLE 4

As previously stated, the novel catalysts of our invention are extremely effective in continuous polymerization procedures at temperatures within the range of about 140 to about 200° C. To illustrate this aspect of the invention a small, stainless-steel autoclave was equipped with a magnetic stirrer and inlet and outlet valves so that the pressure could be maintained constant while product was removed continuously from the reaction into a reservoir at lower pressure. The free volume of the stirred autoclave was 85 cc. Catalyst was pumped continuously into the ethylene feed line which was chilled so that no reaction could take place until the mixture reached the stirred zone of the autoclave. The pressure in the autoclave was raised to 17,000 p.s.i. and the temperature to 160° C. When temperature equilibrium had been attained, a solution of 0.20% bis(2-ethyl-2-hexenoyl) peroxide was pumped to the autoclave at a rate of 97.4 ml./hr. The pumping rate of the ethylene was 1088 g./hr. and the contact time approximately 3 minutes. Reaction started almost immediately, as evidenced by an increase in the reaction temperature in the autoclave to 175° C. After passing through the autoclave, the polymer dissolved in high-pressure ethylene and was fed to a separator maintained at 150° C. where the pressure was reduced to 3000 p.s.i. and the excess ethylene vented.

The reaction was run as described above for 35 minutes, after which the catalyst pump was cut of, the reactor vented and the separator cooled to room temperature. The yield of polymer was 74.7 g. This material had a melt index of 8.2 and a conditioned density of 0.930.

EXAMPLE 5

An important feature of the catalysts of this invention is their ability to form intermediate-density polyethylene, i.e., polyethylene having a density in the range of 0.935 to 0.945, in a continuous process. Hence, ethylene was polymerized as in Example 4, except that the temperature was maintained at 156° C. for 45 minutes. 82.0 g. of polyethylene having a density of 0.936 and a melt index of 2.3 was obtained.

EXAMPLE 6

The catalysts of our invention are extremely versatile in that they can be used in the polymerization of any of the conventional ethylenically unsaturated polymerizable compounds known in the art and particularly the monoolefins containing 2 to 10 carbon atoms. Hence, 50 cc. of benzene, 10.0 ml. of distilled styrene and .1 ml. of 50% bis(2-ethyl-2-hexonyl) peroxide were placed in a pressure bottle and the air removed by flushing with nitrogen. The bottle was sealed and heated to 70° C. for 2 hours. It was then cooled down and opened. The polymer was precipitated with methanol and after drying 2.6 g. of solid polystyrene was obtained.

The novel catalysts of this invention are equally effective in polymerizing non-hydrocarbon monoethylenically unsaturated compounds. Hence, when 10 ml. of a vinyl monomer such as methyl methacrylate is substituted for styrene in the above procedure, 3.2 g. of solid polymethyl methacrylate is obtained.

Thus, this invention provides a new and improved class of peroxide catalysts which can be used in the polymerization of ethylenically unsaturated polymerizable compounds over a broad temperature range. Such versatile catalysts are extremely useful in the preparation of ethylene polymers of intermediate density. Furthermore, these catalysts, since they are insensitive to shock, can be handled without special precautions in commercial equipment.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. Unsaturated, α-substituted diacyl peroxides having the formula:

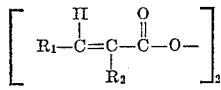

wherein $R_1$ is a member selected from the group consisting of aliphatic, alkaryl and cycloaliphatic radicals containing 1 to 14 carbon atoms and $R_2$ is a member selected from the group consisting of alkyl, cycloalkyl and alkoxy radicals containing 1 to 6 carbon atoms.

2. The compound of claim 1 wherein $R_1$ is an aliphatic radical containing 1 to 14 carbon atoms and $R_2$ is an alkyl radical containing 1 to 6 carbon atoms.

3. Bis(2-ethyl-2-hexenoyl) peroxide.
4. Bis(2-ethyl-4-methyl-2-pentenoyl) peroxide.
5. Bis(2,4-dimethyl-2-pentenoyl) peroxide.
6. Bis(2-methyl-2-pentenoyl) peroxide.
7. Bis(2-methyl-3-cyclohexyl-2-propenoyl) peroxide.
8. Bis(2-methoxy-2-pentenoyl) peroxide.
9. The process for the polymerization of at least one unsaturated polymerizable compound containing a $$CH_2=C<$$

group which comprises polymerizing said compound at a pressure of at least 5,000 p.s.i. and a temperature within the range of about 50 to about 225° C., in the presence of an unsaturated, α-substituted diacyl peroxide having the formula:

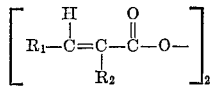

wherein $R_1$ is a member selected from the group consisting of aliphatic, alkaryl and cycloaliphatic radicals containing 1 to 14 carbon atoms and $R_2$ is a member selected from the group consisting of alkyl, cycloalkyl and alkoxy radicals containing 1 to 6 carbon atoms.

10. The process of claim 9 wherein $R_1$ is an aliphatic radical containing 1 to 14 carbon atoms and $R_2$ is an alkyl radical containing 1 to 6 carbon atoms.

11. The process of claim 9 wherein the diacyl peroxide catalyst is bis(2-ethyl-2-hexenoyl) peroxide.

12. The process of claim 9 wherein the diacyl peroxide catalyst is bis(2-ethyl-4-methyl-2-pentenoyl) peroxide.

13. The process of claim 9 wherein the diacyl peroxide catalyst is bis(2,4-dimethyl-2-pentenoyl) peroxide.

14. The process of claim 9 wherein the diacyl peroxide catalyst is bis(2-methyl-2-pentenoyl) peroxide.

15. The process of claim 9 wherein the diacyl peroxide catalyst is bis(2-methyl-3-cyclohexyl-2-propenoyl) peroxide.

16. The process of claim 9 wherein the diacyl peroxide catalyst is bis(2-methoxy-2-pentenoyl) peroxide.

17. A continuous process for the polymerization of ethylene which comprises polymerizing ethylene at a pressure of at least 5,000 p.s.i. and a temperature within the range of about 140 to about 225° C. in the presence of an unsaturated, α-substituted diacyl peroxide catalyst having the formula:

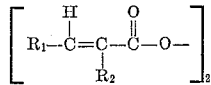

wherein $R_1$ is a member selected from the group consisting of aliphatic, alkaryl and cycloaliphatic radicals containing 1 to 14 carbon atoms and $R_2$ is a member selected from the group consisting of alkyl, cycloalkyl and alkoxy radicals containing 1 to 6 carbon atoms.

18. A batchwise process for the polymerization of ethylene which comprises polymerizing ethylene at a pressure of at least 5,000 p.s.i. and a temperature within the range of about 50 to about 130° C. in the presence of an unsaturated, α-substituted diacyl peroxide catalyst having the formula:

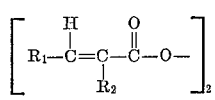

wherein $R_1$ is a member selected from the group consisting of aliphatic, alkaryl and cycloaliphatic radicals containing 1 to 14 carbon atoms and $R_2$ is a member selected from the group consisting of alkyl, cycloalkyl and alkoxy radicals containing 1 to 6 carbon atoms.

References Cited in the file of this patent

UNITED STATES PATENTS

| | | |
|---|---|---|
| 2,379,390 | Tuerck | June 26, 1945 |
| 2,593,399 | Park | Apr. 22, 1952 |
| 2,775,618 | Dittman et al. | Dec. 25, 1956 |
| 2,793,201 | Gochenour | May 21, 1957 |
| 2,865,904 | Seed et al. | Dec. 23, 1958 |